United States Patent [19]

Johnson

[11] 3,860,535

[45] Jan. 14, 1975

[54] DUAL CROSS-FLOW CATALYST SYSTEM

[75] Inventor: James R. Johnson, White Bear Lake, Minn.

[73] Assignee: Minnesota Mining and Manufacturing Company, St. Paul, Minn.

[22] Filed: Jan. 4, 1973

[21] Appl. No.: 321,021

[52] U.S. Cl............ 252/472, 252/477 R, 423/213.7
[51] Int. Cl............................................... B01j 11/22
[58] Field of Search...... 252/477 R, 472; 423/213.7; 23/288 F

[56] References Cited
UNITED STATES PATENTS

| | | | |
|---|---|---|---|
| 3,065,595 | 11/1962 | Gary | 423/213.2 |
| 3,086,353 | 4/1963 | Ridgway | 23/288 F |
| 3,228,746 | 1/1966 | Howk et al. | 423/213.7 |
| 3,295,919 | 1/1967 | Henderson et al. | 23/288 F |
| 3,565,830 | 2/1971 | Keith et al. | 252/466 PT |
| 3,701,823 | 10/1972 | Hardison | 423/213.7 |
| 3,741,725 | 6/1973 | Graham | 423/213.7 |

*Primary Examiner*—Daniel E. Wyman
*Assistant Examiner*—W. J. Shine
*Attorney, Agent, or Firm*—Alexander, Sell, Steldt & DeLaHunt

[57] ABSTRACT

A dual catalyst system comprises a cross-flow or countercurrent flow honeycomb ceramic body coated with two catalysts, for example, in one direction with a reducing catalyst and in the other direction with an oxidizing catalyst. Such a catalyst system may be mounted so that auto exhaust gases first pass through the reducing catalyst to reduce $NO_x$ and thereafter pass through the oxidizing catalyst to oxidize carbon monoxide and hydrocarbons. The heat from the latter reaction aids materially in providing suitable conditions for the first reaction.

11 Claims, 4 Drawing Figures

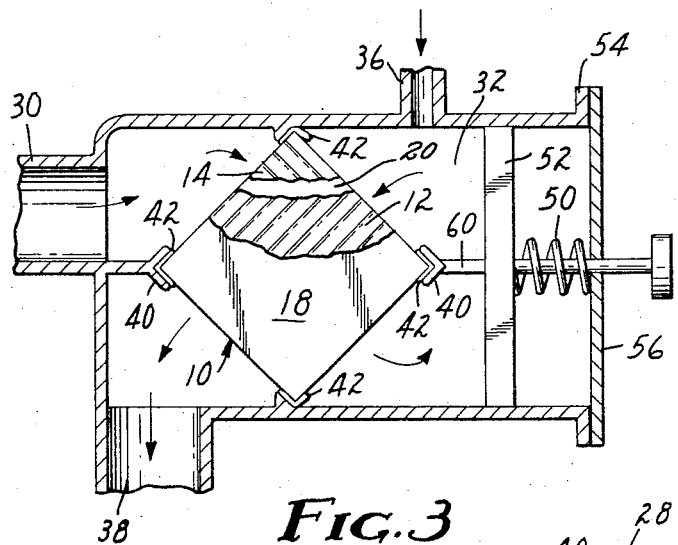
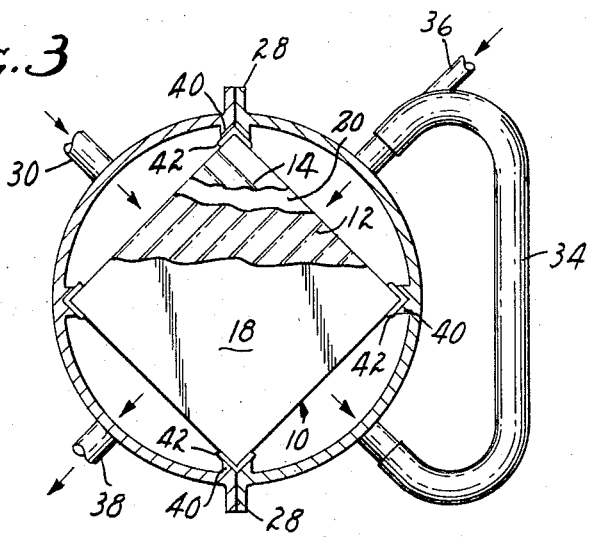
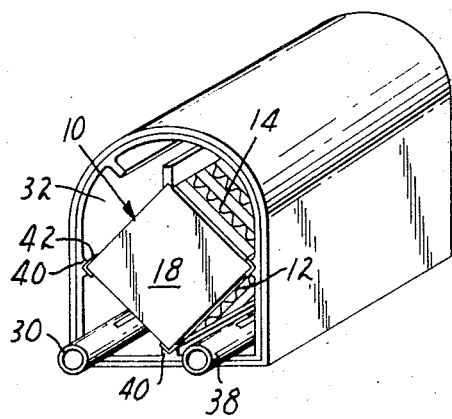
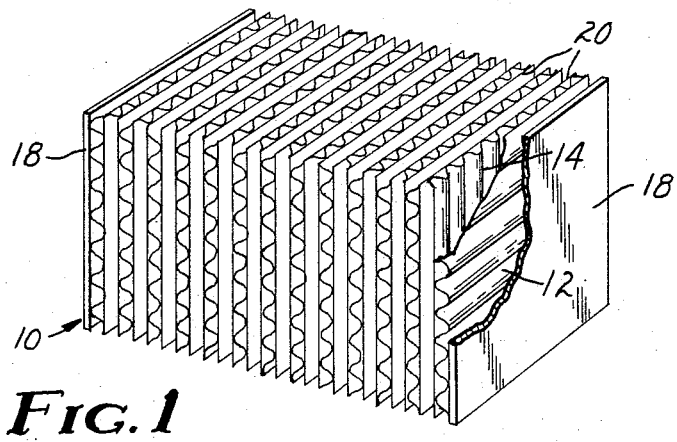

DUAL CROSS-FLOW CATALYST SYSTEM

This invention relates to a dual catalyst system and particularly to an integral supported dual catalyst system for use for successive reactions in the same flow line.

For certain purposes and most particularly in the control of pollution from exhaust of automobile engines, it is considered desirable to react two different classes of materials by different reactions. Thus, in connection with the exhaust of vehicles such as automobiles, it is desirable to remove both oxidizable materials such as carbon monoxide (CO) and hydrocarbons (HC) as well as reducible materials such as oxides of nitrogen ($NO_x$). It is imperative that the nitrogen oxides be reduced first, e.g., by reaction with carbon monoxide, and then the residual carbon monoxide and hydrocarbons are oxidized. The first reaction usually requires heat, depending upon particular conditions which cannot be well-defined, and is efficient only at relatively high temperatures, e.g., from 370° C. (700° F.) and upward. The second reaction requires additional oxygen and is exothermic. The reactions (not quantitatively balanced) may be represented as follows:

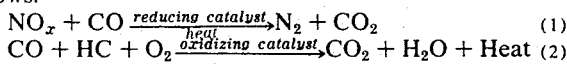

$$NO_x + CO \xrightarrow[heat]{reducing\ catalyst} N_2 + CO_2 \quad (1)$$
$$CO + HC + O_2 \xrightarrow{oxidizing\ catalyst} CO_2 + H_2O + Heat \quad (2)$$

British Pat. No. 931,096 (corresponding to German Pat. No. 1,187,555, Swiss Pat. No. 304,603 and Japan Pat. No. 292,558 and 300,866 as well as, in part, to U.S. Pat. No. 3,444,925) includes a large group of catalytic materials which can be incorporated in ceramic structures as well as describing, for example, the impregnation of alumina structures using chromic acid and hydrated alumina to give catalysts for oxidation of exhaust gases. Somewhat similar catalysts are also described, for example, in U.S. Pat. Nos. 3,088,271 and 3,109,715, as well as in Keith, U.S. Pat. No. 3,565,830, but in all cases it appears that catalysts are impregnated on the entire support structures and where successive reactions are needed resort must be had to using successive catalysts in successive chambers. This is not particularly effective use of space inasmuch as greater volumes are employed. Particularly where one reaction requires additional heat there is an additional problem with supplying the additional heat when the engine is first started. The heat of the exhaust gases themselves is not likely to be adequate.

It is an aim and object of this invention to provide a catalyst system in which a single support is utilized for two catalyzed reactions. Other objects will become apparent hereinelsewhere.

In accordance with these and other objects of the invention it is now found that two catalysts can be applied to a single integral cross-flow or countercurrent flow ceramic structure so that one is in passes in a first direction and the second is in passes in a second direction. Preferably in a cross-flow structure the passages are at right angles and are separated only by thin common walls. There is thus provided a dual catalyst system comprised of a cross-flow catalyst support and two different catalysts.

Although there has been some intimation in the press (cf., for example, Lipsky, page 4, Wall Street Journal for Sept. 26, 1972) that two catalysts could be used together and that the reducing catalyst could be mounted inside the oxidizing catalyst, the use of two catalysts on one support as herein described and claimed does not appear to have been suggested heretofore.

The cross-flow ceramics used as catalyst supports are described in various of the above mentioned patents and have been employed without catalysts in waste gas incinerating devices as described in U.S. Pat. No. 3,224,842. They may be constructed of any desired ceramic material such as alumina, cordierite, zirconmullite, etc. Ceramic structures which it is found may be employed as catalyst supports with at least partial countercurrent flow are provided by the bodies produced for heat exchangers in U.S. Pat. No. 3,198,248, in which first and second multiplicities of passageways are parallel over at least a portion of their lengths. All that is necessary is to use rather thinner ceramic compositions, suitably coated with active high surface area alumina or silica, in place of the denser ceramics preferred for heat exchangers.

For convenience the passageways on either side of a corrugated spacer bonded on the outer sides by flat sheets is termed a group of passageways. The number of such groups required in all may be from two to three upward to the hundreds or thousands depending on the catalytic area sought. A group may also be considered a rank or bank of passageways. Although reference is here made particularly to integral ceramic structures composed of honeycombs made up from alternating corrugated and flat sheets, other integral structures may also be treated as here described to give dual-catalyst systems provided only that groups of passageways may be isolated during treatment with catalyst and for subsequent passage of gas therethrough.

The invention is further described by aid of the accompanying figures which are somewhat diagrammatic.

FIG. 1 shows an integral supported dual-catalyst system of the invention with one corner broken away.

FIG. 2 shows how the dual-catalyst system of the invention is employed in a so called "mail box" container as described in U.S. Pat. No. 3,224,842.

FIGS. 3 and 4 show the dual catalyst system of the invention mounted in other containers.

Referring to FIG. 1, it will be seen that catalyst support 10 is broken away at one corner revealing passageways in directions at right angles to one another here designated 12 for the horizontal and 14 for the vertical passages. It will be recognized that the horizontal or vertical position with respect to the earth's surface is immaterial, and in the mounted catalyst supports in FIG. 2, the two types of passageways 12 and 14 are at about 45° to the horizontal. Although it is not possible to show it in the figures, passageways 14 are coated with one catalyst, for example, platinum and ruthenium or non-noble metal catalyst for reduction of $NO_x$ by equation 1 above, and passageways 12 are coated with a different catalyst, for example, platinum or non-noble metal catalyst, for oxidation of CO and hydrocarbons by equation 2 above. It is preferred to employ the passageways at the two ends having end plates 18 for an exothermic reaction and confine endothermic reactions and reactions requiring elevated temperatures to internal passageways because heat is thereby better utilized.

In referring to passageways, it is intended to include the individual openings on either side of a corrugated member of the catalyst support. The flat members of the catalyst support provide common walls between passageways in different directions.

An important feature of support catalysts of the invention is shown in FIG. 1 where it will be seen that passageways 12 and 14 are separated only by thin common or mutual ceramic wall 20. This permits ready passage of heat from one set of passageways to the other. There may be one or more layers of passageways either separately or in several groups in each multiplicity. It will be noted that the common ceramic walls as well as end panels are integrally bonded to the corrugated spacers forming the passageways and several spacer and even flat sheets may be present in each multiplicty. Although it is preferred that the ceramic walls are not permeable to gases, a small permeability is not harmful as the small leakage does not affect the overall efficiency of the units. A considerably more serious problem is that of gases which bypass the catalysts and leak around the catalyst support. The possibility is seen especially in FIGS. 2, 3 and 4 where supported catalysts are shown mounted in various containers. It will be seen below that provision is readily made for this problem.

In FIGS. 3 and 4 corners are shown broken away as in FIG. 1, exposing passageways 12 and 14 and ceramic walls 20. In FIGS. 2, 3 and 4 there are entry ports 30 for introduction of polluted exhaust gases from an internal combustion or diesel engine which gases flow in the direction indicated by the arrows passing first one catalyst in passageways 14 effective, for example, for promoting reduction of $NO_x$ and subsequently re-entering the catalyst support in a crosswise direction through passageways 12 where a different catalyst effects oxidation of hydrocarbons and $CO_2$. The oxidized and relatively non-polluting gases leave by exit ports 38. The gases may be introduced into the crosswise direction either by passing through plenum space 32 as shown in FIGS. 2 and 3 or a by-pass connection 34 as shown in FIG. 4. Because extra oxygen is necessary for this latter reaction additional air is introduced as indicated at air ports 36 in FIGS. 3 and 4 (air port not shown in FIG. 2).

In mounting catalyst supports as shown, angle pieces 40 are provided for the corners and these are advantageously further padded with a resilient inorganic material, for example, a mineral wool capable of withstanding local temperature conditions, as shown at 42 in FIGS. 3 and 4. In the device of FIG. 4 the shell is openable along the line of flanges 28 for introduction of the catalyst support and appropriate strips of suitable padding are introduced. In the device of FIG. 3 the one side 56 is removable along flanges 54 and after introduction of the support with appropriate pads the side 56 is reattached and spring 50 acting against slider 52 to which arm 60 is attached urges firm contact at the corresponding corner of the catalyst support as shown.

The dual-catalyst system of the invention may utilize any desired catalysts which are not mutually inactivating because of the closeness of their positions in the support. Furthermore the ceramic support may be prepared for the catalyst in any desired manner, for example, by deposition of high surface area coatings such as of alumina. Thus, the entire ceramic piece is dipped into a dispersion of monohydrated alumina in water, drained and, after drying, fired to about 500° C. This procedure effectively increases the surface area of the substrate. Then, the passageways 12 are closed off by suitable means such as with rubber pads or the openings may be sealed with wax, and the ceramic piece is dipped into a solution (2.6 to 4.0 gm/100 gm soln.) of chloroplatinic acid containing palladium chloride (0.7 to 1.2 gm/100 gm soln.). The solution fills passageways 14. After draining the solution and drying the piece, the means blocking passageways 12 are removed and the ceramic piece is fired in a hydrogen atmosphere at 400° – 500° C. This procedure provides the oxidizing catalyst. Passageways 14 of the ceramic piece are then closed off by suitable means such as rubber pads or alternative techniques and the piece is placed in a solution of chloroplatinic acid (2.6 to 4.0 gm/100 gm soln.). This procedure fills passageways 12. After draining the solution and drying the piece, the rubber pads (or other means closing passageways 14) are removed and the piece is again fired in hydrogen atmosphere at 400° – 500° C. This procedure provides the reducing catalyst.

The support is now mounted in a suitable container as shown in the figures and incorporated in the exhaust line of an internal combustion engine with means for providing supplemental air as described above through ports 36. Exhaust gases are analyzed before entering the device and after leaving it and are found to have substantially reduced content of $NO_x$, CO and hydrocarbons after passing through the device.

What is claimed is:

1. An integral supported dual-catalyst system comprising:
   I. A ceramic honeycomb catalyst support having a first multiplicity of passageways having a first specific direction and a second multiplicity of passageways having a second specific direction separated from said first multiplicity by thin common ceramic walls and,
   II. A first catalyst coated on the walls of said first multiplicity of passageways and a second catalyst coated on the walls of said second multiplicity of passageways,
   said first catalyst and said second catalyst not being mutually inactivating.

2. A supported dual-catalyst system according to claim 1 wherein the first and second multiplicities of passageways are mutually at an angle of about 90°.

3. A supported dual-catalyst system according to claim 2 wherein groups of passageways of the first multiplicity alternate with groups of passageways of the second multiplicity, and successive groups have thin common ceramic walls.

4. A supported dual-catalyst system according to claim 2 wherein several groups of passageways of the first multiplicity are separated from several groups of passageways of the second multiplicity by a single common wall.

5. A supported dual-catalyst system according to claim 1 wherein the first and second multiplicities of passageways are parallel over at least a portion of their lengths.

6. A supported dual-catalyst system according to claim 1 wherein the first catalyst is a reduction catalyst and the second catalyst is an oxidation catalyst.

7. A supported dual-catalyst system according to claim 6 wherein the reduction catalyst catalyzes reduction of nitrogen oxides and the oxidation catalyst catalyzes the oxidation of carbon monoxide.

8. Process for the production of a supported dual-catalyst system comprising the steps of:
  I. depositing a first catalyst in a first multiplicity of passageways in an integral ceramic honeycomb structure comprising first and second multiplicities of passageways separated from each other by thin common ceramic walls and having first and second specific directions respectively, and
  II. depositing a second catalyst in the second multiplicity of passageways,
said first catalyst and said second catalyst not being mutually inactivating.

9. Process according to claim 8 wherein the first multiplicity of passageways and the second multiplicity of passageways are at about 90° to each other.

10. Process according to claim 9 wherein the first catalyst is adapted to the reduction of nitrogen oxides and the second catalyst is adapted to the oxidation of at least one of carbon monoxide and hydrocarbons.

11. A supported dual-catalyst system according to claim 7 wherein the reduction catalyst for nitrogen oxides is platinum and the oxidation catalyst for oxidation of carbon monoxide is platinum and palladium.

* * * * *